United States Patent
Ghera et al.

(10) Patent No.: US 6,519,082 B2
(45) Date of Patent: Feb. 11, 2003

(54) APPARATUS AND METHOD FOR A SELF-ADJUSTING RAMAN AMPLIFIER

(75) Inventors: Uri Ghera, Tel-Aviv (IL); Doron Meshulach, Ramat Gan (IL); Ophir Eyal, Ramat Hasaron (IL); Roberto Klein, Tel Aviv (IL)

(73) Assignee: Redc Optical Networks Ltd., Tel Aviv (IL)

( * ) Notice: Subject to any disclaimer, the term of this patent is extended or adjusted under 35 U.S.C. 154(b) by 0 days.

(21) Appl. No.: 10/079,525

(22) Filed: Feb. 22, 2002

(65) Prior Publication Data

US 2002/0159134 A1 Oct. 31, 2002

Related U.S. Application Data

(63) Continuation-in-part of application No. 09/791,685, filed on Feb. 26, 2001, now Pat. No. 6,433,922.

(51) Int. Cl.[7] ............................................. H01S 3/00
(52) U.S. Cl. ................................. 359/341.4; 359/334
(58) Field of Search .......................... 359/334, 345, 359/124, 341.4

(56) References Cited

U.S. PATENT DOCUMENTS

| | | |
|---|---|---|
| 4,401,364 A | 8/1983 | Mochizuki |
| 4,616,898 A | 10/1986 | Hicks |
| 4,699,452 A | 10/1987 | Mollenauer |
| 5,623,508 A | 4/1997 | Grubb et al. |
| 5,673,280 A | 9/1997 | Grubb et al. |
| 5,966,206 A | 10/1999 | Jander |
| 6,038,356 A | 3/2000 | Kerfoot et al. |
| 6,052,219 A | 4/2000 | Kidorf et al. |
| 6,072,614 A | 6/2000 | Roberts |
| 6,081,366 A | 6/2000 | Kidorf |
| 6,292,288 B1 * | 9/2001 | Akasaka et al. ............ 359/334 |

FOREIGN PATENT DOCUMENTS

JP WO00/05622 7/1999

OTHER PUBLICATIONS

G P Agrawal; "Nonlinear fiber optics" pp. 316–369 Academic press, 2nd Edition,1995.
R G Smith "Optical power handling capacit of low loss optical fibers as determined by Stimulate Raman and Brillouin scattering" Applied Optics vol. 11, No. 11, p. 2489 1972.
R T Stolen, "Raman Gain in glass optical waveguides" Applied Physics Letters, vol. 22 No. 6, p. 276, 1973.
J Auyeung et al "Spontaneous and stimulated Raman scattering in long low loss fibers" Journal of Quantum Electronics vol. QE–14 No. 5, p. 347, 1978.
"Erbium–Doped Fiber Amplifiers—Fundamentals and Technology" by P.C. Becker et al, pp. 346–351, Academic Press 1999.
"Fiberoptic test and measurement" by D. Derickson Prentice Hall Inc. New Jersey 1998.

(List continued on next page.)

Primary Examiner—Mark Hellner
(74) Attorney, Agent, or Firm—Mark M. Friedman

(57) ABSTRACT

An apparatus and method for a self-adjusting Raman amplifier for fiber optic transmission lines incorporating a line diagnostic mechanism in order to calculate, control and optimize the operating parameters for the amplifier. A Line Analyzing Unit, adjacent to the Raman pump unit, operates before the Raman pump is enabled and during operation, and characterizes the transmission line. The Line Analyzing Unit determines and characterizes the types of optical fibers installed along the transmission line and calculates and optimizes the pump or pumps power in order to achieve optimum gain, gain equalization and gain tilt. The Line Analyzing Unit may also determine if there is an optical loss or reflection in the optical fiber that can be destructive when the high power Raman pump is operating.

35 Claims, 10 Drawing Sheets

OTHER PUBLICATIONS

T. Terahara et al. "128×10.66 Gbts/s transmission over 840–km standard SMF with 140–km optical repeater spacing (30.4–dB loss) employing dual–band distributed Raman amplification", ppr PD28 Optical Fiber Communication Conference 2000, Baltimore, MD, USA Mar. 7–10, 2000.

C. Fludger et al. "An analysis of the improvements in OSNR from distributed Raman amplifiers using modern transmission fibres" FF2–1 Optical Fiber Communication Conference 2000, Baltimore, MD, USA Mar. 7–10, 2000.

* cited by examiner

APPARATUS AND METHOD FOR A SELF-ADJUSTING RAMAN AMPLIFIER

CROSS REFERENCE TO RELATED APPLICATIONS

This is a continuation in part of U.S. application Ser. No. 09/791,685 filed Feb. 26, 2001 now U.S. Pat. No. 6,433,922.

BACKGROUND OF THE INVENTION

1. Field of the Invention

The present invention relates generally to optical amplifiers used in fiber optics for telecommunications. More particularly, the invention relates to a Raman optical fiber amplifier and method and apparatus for enabling dynamic self-adjusting gain optimization and for equalizing amplified optical output.

2. Background Art

In optical fiber communication systems, communication channels can be provided by transmitting signals impressed on laser beams having different wavelengths (WDM). Although optical fiber communication systems utilizing wavelength-distinct modulated channels may carry information over long distances, signals transmitted through optical fibers are attenuated mainly by the cumulative and combined effects of absorption and scattering. While the signal attenuation per kilometer in optical fibers used for communications is typically low, signals transmitted over increasing transmission distances require periodic amplification over long distances. Amplification in fiber optic communication systems is performed mainly by electronic repeaters, Erbium doped fiber amplifiers (EDFA's), semiconductor optical amplifiers, waveguide amplifiers and Raman amplifiers.

While amplification using electronic repeaters involves optical to electrical to optical conversions, amplification using EDFA's, semiconductor optical amplifiers. waveguide amplifiers and Raman amplifiers is performed directly on optical signals, involving no optical to electrical to optical conversions. The Raman amplification process significantly differs from other amplification methods mentioned, as the transmission line itself can serve as the gain medium, whereas a module or component dedicated for the amplification process is used in other amplification methods. The Raman amplification process is based on the Raman effect, which describes conversion or scattering of a fraction of the optical power from an incident optical beam having a higher optical frequency to an optical beam having a lower optical frequency. The optical frequency shift between the incident beam and the scattered beam is determined by the vibrational states of the medium through which both beams are propagating. The Raman effect in silica-based fibers is described by quantum mechanics as scattering of an incident photon by a molecule to a photon with a lower optical frequency, while the molecule makes a transition between two vibrational states of the medium. Raman amplification involves Stimulated Raman scattering, where the incident beam, having the higher optical frequency, often referred to as the pump beam, is used to amplify the lower optical frequency beam, often referred to as the Stokes beam or the signal beam, through the Raman effect. The pump beam pumps the molecules of medium to an excited vibrational state, while the photons of the signal beam propagating through the excited molecules stimulate the emission of photons at the signal frequency, thereby amplifying the signal while the excited molecules return to their lower vibrational states [See for example "Nonlinear fiber optics" by G. P. Agrawal, pp. 316–369, Academic Press, 2nd edition, 1995]. Stimulated Raman scattering may involve a multiplicity of pumps at different frequencies and a multiplicity of signals at different frequencies.

A Raman amplifier, which is based on the Stimulated Raman scattering effect, may amplify a single optical channel, as well as collectively amplify a series of optical signals, each carried on a wavelength corresponding to a distinct channel. A Raman amplifier with a single pump source, where a fiber optic is used as the gain medium can amplify signals extending over a wide frequency range, referred to as the Raman gain spectrum or the Raman gain band. The Raman gain spectrum in silica optical fibers extends over a wide frequency range, with a broad peak downshifted by about 13 THz from the pump frequency. The Raman gain spectrum in optical fibers is not associated with fixed energy levels of the gain medium, as with rare earth element dopants in glass based fibers such as Erbium. Consequently, Raman amplification can be achieved practically at any wavelength in the near infra-red spectrum, as long as the appropriate pumping light source is available. This advantage allows Raman amplification to be applied for optical communications across the entire optical communication transmission window of silica optical fibers.

Raman amplification in optical fibers was thoroughly investigated in the seventies [R. G. Smith, "Optical power handling capacity of low loss optical fibers as determined by Stimulated Raman and Brillouin scattering", Applied Optics, Vol. 11 No. 11, p. 2489, 1972, R. H. Stolen et al., "Raman gain in glass optical waveguides", Applied Physics Letters, Vol. 22 No.6, p. 276, 1973, and J. Auyeung et al., "Spontaneous and stimulated Raman scattering in long low loss fibers", Journal of Quantum Electronics, Vol. QE-14 No. 5, p. 347, 1978]. By the early eighties, the use of Raman amplifiers in optical communication systems had been proposed for multi-wavelength transmission [Mochizuki et al., "Optical repeater system for optical communication", U.S. Pat. No. 4,401,364; Hicks, Jr. et al., "Optical communication system using Raman repeaters and components therefor", U.S. Pat. No. 4,616,898; and Mollenauer et al., "Optical communications system comprising Raman amplification means", U.S. Pat. No. 4,699,452]. However, reliable commercial and affordable high power means for Raman pumping of single mode fibers did not exist in the 1980s, and Raman amplification was usually considered for highly special uses such as Soliton transmission [Mollenauer et al., "Optical communications system comprising Raman amplification means", U.S. Pat. No. 4,699,452].

In the late 90's, as high power EDFA's became common, reliable high power pump laser diodes at the 1480 nm wavelength range were commercially available. As this wavelength range is also suitable for pumping of silica fibers Raman amplifiers [See for example "Erbium-Doped Fiber Amplifiers—Fundamentals and Technology", by P. C. Becker et al., pp. 346–351, Academic Press, 1999], Raman amplifiers received renewed attention [Grubb et al., "Article comprising a counter-pumped optical fiber Raman amplifier", U.S. Pat. No. 5,623,508; Grubb et al., "Article comprising low noise optical fiber Raman amplifier", U.S. Pat. No. 5,673,280; Kerfoot et al., "Lightwave transmission system employing Raman and rare-earth doped fiber amplification", U.S. Pat. No. 6,038,356; Kidorf et al., "Wide bandwidth Raman amplifier capable of employing pump energy spectrally overlapping the signal", U.S. Pat. No. 6,052,219; Kidorf et al., "Optical fiber communication system with a distributed Raman amplifier and a remotely pumped Er-doped fiber amplifier", U.S. Pat. No. 6,081,366; Y. Akasaka et al., "Raman amplifier optical repeater and Raman amplification method", WO005622A1; T. Terahara et al., "128×10 Gbits/s transmission over 840-km standard SMF with 140-km optical repeater spacing (30.4-dB loss) employing dual-band distributed Raman amplification", paper PD28, Optical Fiber Communication Conference 2000, Baltimore, Md., USA, Mar. 7–10, 2000]. In comparison with EDFAs, Raman amplifiers allow amplification of a wider optical spectrum, with typically lower optical noise and over longer distances.

In contrast to EDFAs, where amplification properties are dependent only on the EDFA module, the transmission line itself can be used as the gain medium of a Raman amplifier, and thus, amplification properties such as gain and gain equalization are closely related to the type, properties and characteristics of the fiber used and the fiber condition (e.g. the distribution of losses along the fiber, the fiber effective area, Raman gain coefficient of the fiber and fiber length) [C. Fludger et. al., "An analysis of the improvements in OSNR from distributed Raman amplifiers using modern transmission fibers", paper FF-2 Optical Fiber Communication Conference 2000, Baltimore, Md., USA, Mar, 7–10, 2000.]. Thus it is impossible to accurately predict the performance of the Raman amplifier, including gain, gain equalization and noise properties, without a thorough knowledge of the fiber types properties, characteristics and conditions along the fiber optic transmission line. Moreover, the condition of the transmission line can have another critical influence on Raman amplifier performance. If the physical contact between two connectors joining two segments of the line is inadequate (such as air gaps between connectors), an electric arc at that point can be caused by the high optical power density associated with the Raman pumping. Such an electric arc may cause high losses at the point where it occurs, and can render the whole transmission line unusable [Jander et al., "Interlocked high power fiber system using OTDR", U.S. Pat. No. 5,966,206].

As result of the dependence of Raman amplifier performance on the optical fiber characteristics (along the first tens of kilometers from the pump source) there is a need for a Raman amplifier that incorporates a transmission line diagnostic mechanism in order to calculate, adjust and optimize in-situ the operating parameters of the amplifier. Because the transmission line characteristics, as well as the transmitted signals power can change in time (e.g. fiber degradation due to aging and maintenance), this mechanism has to be able to continue performing tests on the optical fiber transmission line during the operation of the Raman amplifier.

There is also a need for this diagnostic mechanism to be able to prevent initiation or continuation of Raman amplification, for example, when launching high power pump into the transmission line can render the whole transmission line unusable.

SUMMARY OF THE INVENTION

This invention describes an apparatus and method for a Raman amplifier for fiber optic transmission lines incorporating a line diagnostic mechanism in order to test and characterize the line, calculate, control and optimize the operating parameters of the amplifier. This need arises because the amplifier gain medium is the transmission line itself and the amplifier properties depend on the optical fiber properties along the first tens of kilometers from the pump source of the transmission line.

According to the present invention there is provided a method of operating an optical fiber transmission line wherethrough signals are transmitted in a signal wavelength band, including the steps of: (a) pumping the transmission line, using at least one optical pump, thereby effecting Raman amplification of the signals; (b) determining at least one characteristic of the optical fiber transmission line; and (c) adjusting a power of the at least one optical pump in accordance with the at least one characteristic.

According to the present invention there is provided an amplifier for an optical fiber transmission line, including: (a) at least one optical pump for pumping the transmission line to amplify signals that are transmitted therethrough by Raman amplification; (b) at least one monitoring system for determining at least one characteristic of the transmission line; and (c) a line analyzing unit for adjusting a power of the at least one optical pump in accordance with the at least one characteristic.

According to the present invention there is provided a method of operating an optical fiber transmission line wherethrough signals are transmitted, including the steps of: (a) pumping the transmission line, using at least one optical pump, thereby effecting Raman amplification of the signals; (b) measuring a power of the signals; and (c) adjusting a power of the at least one optical pump in accordance with the power of the signals.

According to the present invention there is provided an amplifier for an optical fiber transmission line, including: (a) at least one optical pump for pumping the transmission line to amplify signals that are transmitted therethrough by Raman amplification; (b) a monitoring system for measuring a power of the signals; and (c) a line analyzing unit for adjusting a power of the at least one optical pump in accordance with the measured power of the signals.

A Raman optical fiber amplifier for communications is composed of a single or several high power light sources, typically high power laser diodes that act as optical pumps, typically at wavelengths between 1400 and 1500 nm. The amplification is generally performed along the optical fiber transmission line itself, by a non-linear Raman processes. A line analyzing unit, adjacent to the Raman pump unit, determines the types of optical fibers installed along the transmission line, the optical gain and loss distribution along them and other properties. The line analyzing unit may also determine if there exists optical loss that can be destructive when the high power Raman pump light is traversing through the line.

Data received after performing the tests by the line analyzing unit, allows the line analyzing unit to perform calculations required for optimization of the gain, gain equalization and gain tilt for the Raman amplifier, and to enable or disable the Raman pump or pumps. This information can be delivered either to the amplification management unit, or stored in the unit performing the Raman pumping. These tests can be performed continuously during the course of Raman pumping, and can be used to change operational conditions and status when changes along the transmission line occur.

The invention described herein significantly improves upon the prior art by providing an optical fiber transmission line diagnostic mechanism in order to calculate, adjust and optimize in-situ the operating parameters such as the optical power of the pump source or sources of the Raman amplifier. This diagnostic mechanism can also initiate shut-down of the high power pumps, and also prevent initiation of Raman amplification when breaks or cracks are present in the transmission line that would prove destructive. The invention has the capability to continuously monitor the optical fiber transmission line by performing tests during the operation of the Raman amplifier.

DETAILED DESCRIPTION OF THE INVENTION

Figure 1A:
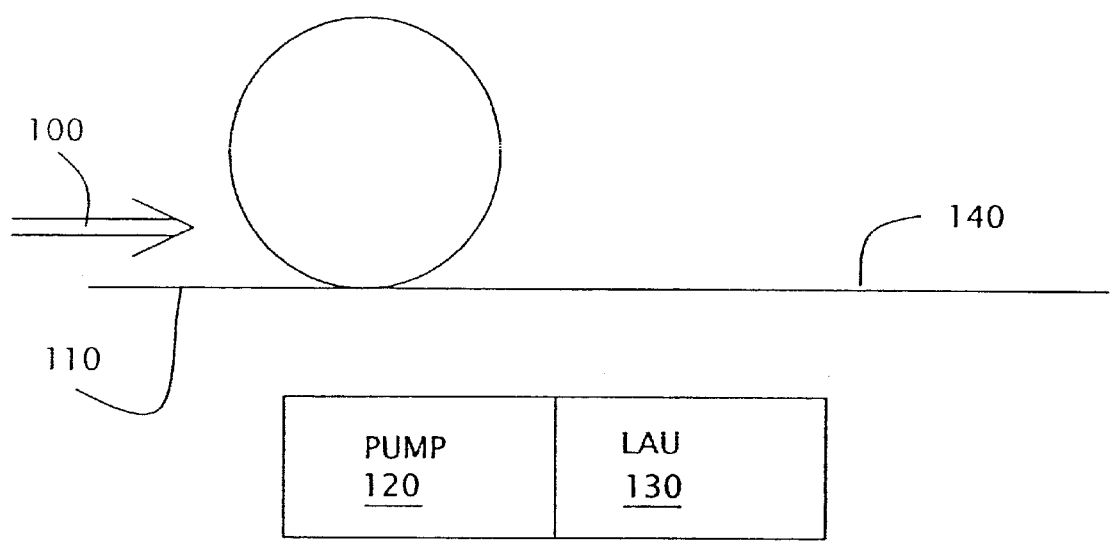
FIG. 1a illustrates the Raman amplification along an optical fiber serving as the transmission line, showing the relationship of the unit performing Raman pumping with the Line Analyzing Unit.

This invention describes an apparatus and method for a self-adjusting Raman amplifier for fiber optic transmission lines incorporating a line diagnostic mechanism in order to test and characterize the line, calculate, control and optimize the operating parameters of the amplifier. The self-adjusting Raman amplifier is comprised of a Raman Pump (RA) and a line analyzing unit (LAU). The RA amplifies the optical data signals as they propagate along the optical fiber. The LAU analyzes and monitors the optical fiber, and accordingly, controls and optimizes the performance of the RA.

During the initialization of the RA, the LAU is used to analyze the optical fiber, as well as the actual amplification obtained and to set the RA parameters accordingly to obtain optimal performance of the RA. Optimal performance of the RA includes optimal gain, gain equalization and gain tilt. During operation, the LAU is used to monitor the transmission line, and dynamically change the parameters of the RA as a response to changes in the transmission line. For example, if signals are routed through a fiber with different characteristics, the LAU will vary the Raman pump power, and update the operator. If the fiber is cut or a connector is open, the LAU will identify such a situation, and prevent the RA from operating and update the operator accordingly.

Optimal performance of the RA should take into account the following parameters of the optical transmission line:
1. Fiber sections, types and lengths and their related Raman gain coefficient and effective area.
2. Quality of connectors and splices along the fiber, maximal allowed launched power and eye-safety related issues.
3. Optical propagation losses at signal and pump wavelengths.

The following techniques are used in the described invention to characterize these line properties:

1. Fiber Sections, Types and Lengths and Their Related Raman Gain Coefficient and Effective Area a) Measuring the Raman on-off gain (on-off gain is obtained as the ratio of the measured signal with and without a pump) for a signal that is within the gain spectrum of the pumps, but outside of the spectral range of the data. From the on-off gain of such a probe signal, the ratio of the Raman gain coefficient to the effective area can be calculated, from which the fiber type can be identified. This ratio is used for calculating the gain and the expected performance of the RA. The signal used to measure the on-off gain can be either a pulsed signal or a continuous wave signal. In the case of a pulsed signal, synchronized with the light source, distribution of Raman gain along the fiber can be measured by time gating the Rayleigh backscattered radiation from different sections of the fiber. In Rayleigh scattering, as discussed earlier, part of the pulse energy is reflected according to [See for example "Fiber optic test and measurements", edited by D. Derickson, Prentice Hall, PTR, 1998]:

$$dp = k\, P(z) dz \quad (1)$$

where dp is the scattered power at position z, dz is an infinitesimal small fiber interval. P(z) is the power at point z, and k is given by:

$$k = \alpha (NA/n)^2 / m \quad (2)$$

where NA is the fiber numerical aperture, n is the refractive index of the fiber core, m depends on the refractive index profile of the fiber and $\alpha$ is the scattering coefficient, which is inversely proportional to the fourth power of the wavelength. By measuring the backscattered radiation within the Raman gain band but outside of the signal data band, and by calculating the anticipated gain shape (pump lasers wavelengths and powers used are known to the LAU), the Raman gain at the signal band can be calculated.

The performance of the Raman amplification of the given transmission line can be calculated by:

a) Measuring the gain of at least one probe signal at least at one wavelength (the wavelength used to measure the on-off gain).

b) Same as (a) but using two or more pump power levels. Comparing the on-off Raman gain at the different pump power levels, with known such values for different fiber types, stored in the LAU, allows to identify more accurately the fiber type. By analyzing the data on fiber type, it is possible to calculate the gain of the transmission link ["An analysis of the improvements in OSNR from distributed Raman Amplifiers using modern transmission fibers" by C. Fludger et. al., "An analysis of the improvements in OSNR from distributed Raman amplifiers using modem transmission fibers", paper FF-2 Optical Fiber Communication Conference 2000, Baltimore, Md., USA, Mar. 7–10, 2000].

c) Measuring the backscattered Raman Amplified Spontaneous Emission (Raman ASE) of a pump, at one or more pump power levels. The ratio of the backscattered Raman ASE measured at two pump power levels indicates the fiber type. From these measurements, the fiber type is identified by comparing the measured data with known such values for different fiber types (as in (b)), stored in the LAU.

d) Measuring the fiber dispersion (with pulses at two or more wavelengths or any other method) and comparing the dispersion data to known data of different fiber types stored in the LAU. This method is based on the fact that standard commercial fibers used for communications are characterized by distinct dispersion curves.

e) Using signal power monitor at the location of the Raman pump unit and adjusting the pump levels to achieve optimal gain, gain equalization and gain tilt.

2. Quality of Connectors and Splices Along the Fiber, Maximal Allowed Launched Power and Eye-safety Related Issues The Raman amplification process in optical fibers requires a high power light source, usually a laser (or a multiplicity of lasers) with typical power of 0.2–2 Watts, to pump molecules of the transmission line medium into excited vibrational modes or states, for subsequent de-excitation by stimulated emission. Such high energy levels can inflict damage on the infrastructure where two fibers are connected (connectors, fusion splice, mechanical splice etc.), and can inflict bodily damage if radiation is directed to the eye. In order to avoid physical damage to body or infrastructure, a mechanism that disables the pump power in case of a faulty fiber or cutting or opening of a connector, has to be incorporated into the LAU. The mechanism can be based on the following measurements:

A possible indication of an open connector is a strong back-reflection of the pump power resulting from Fresnel reflection. In Fresnel reflection, part of the light is reflected due to the discontinuity in the index of refraction at any interface according to:

$$R=(n_1-n_2)^2/(n_1+n_2)^2 \tag{3}$$

Where $n_1$ and $n_2$ are the indices of refraction at the interface discontinuity R is the reflectance, and the reflecting plane is assumed to be perpendicular to the fiber axis. Thus, when a connector is opened a discontinuity in the index of reflection may occur, and a peak in the reflected light, may be detected in some cases, with a coupler or a circulator and an adequate WDM filter. Once such a strong back reflection has been detected, the pump unit is disabled. Then, it is possible to find the location of the open connector or the location of the cut, by sending a pulse, and the distance is obtained by measuring the travel time of the pulse to propagate to the connector and back, in an OTDR-like method [see for example—"Fiber-optic test and measurement", by D. Derickson, Prentice Hall inc., New Jersey, 1998].

3. Optical Propagation Losses at Signal and Pump Wavelengths

Optical propagation losses at signal and pump wavelengths can be measured using an OTDR-like method [see for example—"Fiber-optic test and measurement", by D. Derickson, Prentice Hall inc., New Jersey, 1998]. The unit will be able to send a warning signal to the system management if it detects that pump power is not delivered to the line (tap on the line exiting the LAU) or if there are significant losses of the fiber transmission line (especially close to pump unit) which will render most of the pump energy unusable and thus the whole Raman amplifier as inefficient.

Figure 1B:
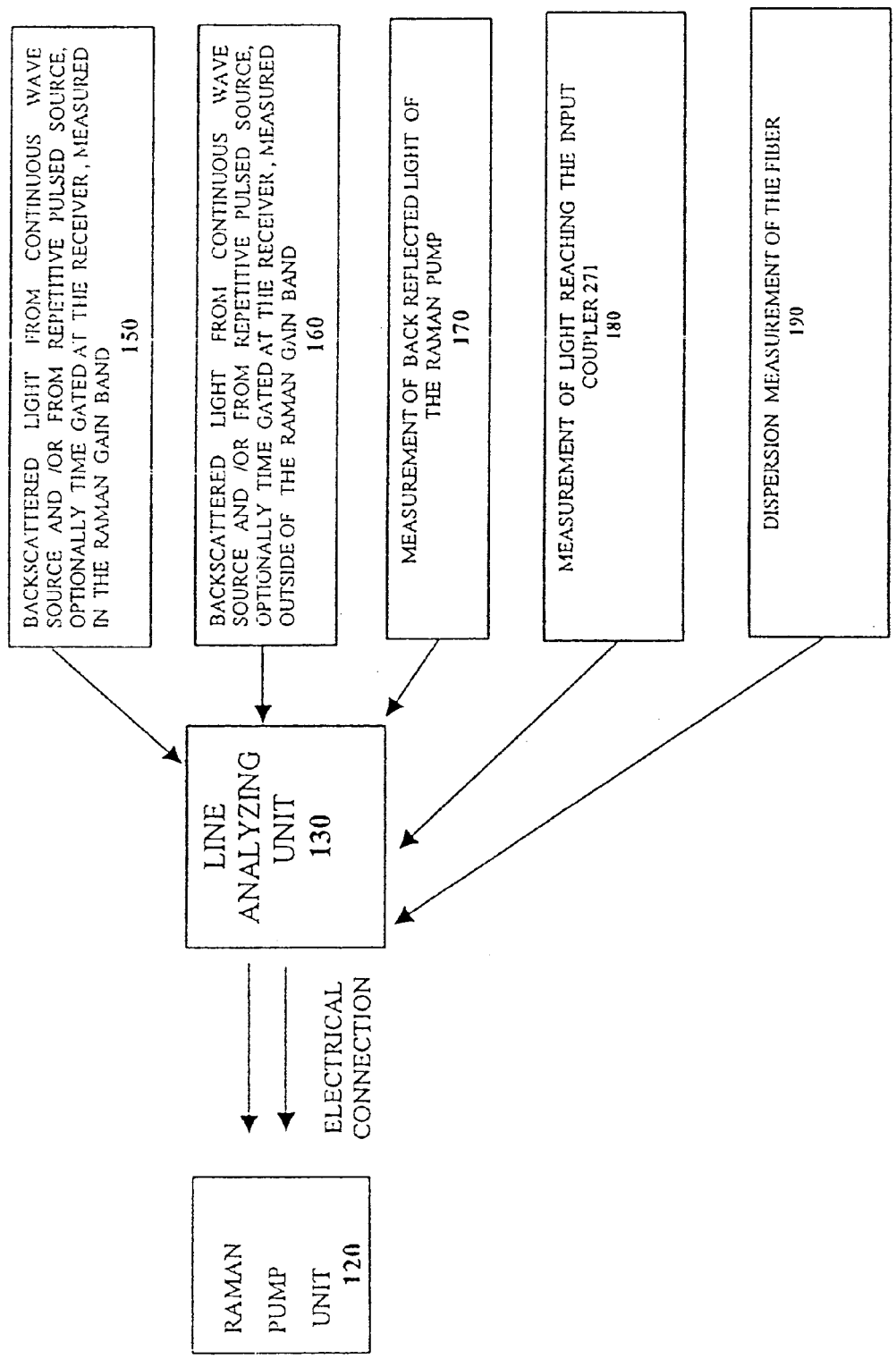
FIG. 1b shows schematically the data received by the Line Analyzing Unit.

A self-adjusting Raman optical fiber amplifier for communications is composed of a single or several high power light sources, typically laser diodes, which act as optical pumps at wavelengths typically between 1400 and 1500 nm, and is shown in FIG. 1a in a typical mode of operation. The amplification of a signal 100 is performed along an optical fiber transmission line 110 by a non-linear Raman processes with a high power Raman pump 120 (Pump 120 could also be placed at the beginning of the line, where pump and data propagate at the same direction, often referred to as forward pumping. Pump 120 could also be placed both at the beginning and at the end of the line, often referred to as forward and backward pumping configurations). A Line Analyzing Unit (LAU) 130, adjacent to the Raman pump unit, is optionally operated before Raman pump 120 is enabled, and characterizes the transmission line. The amplifier provides an amplifier output at a line output 140. LAU 130 determines if there is an optical loss in the fiber that can be dangerous to human beings, or destructive to the optical fiber or equipment, when the high power beam traverses this point. Such optical losses are typically caused by cracks, breaks, unclosed connectors etc. LAU 130 also determines the amplification characteristics and properties of the optical fiber installed along transmission line 110. The different techniques used to perform those measurements are described in FIG. 1b. LAU 130 receives data from several monitoring units, which include: an inside Raman gain band monitoring system 150 for backscattered light from a continuous wave source and/or from repetitive pulsed source, optionally time gated at the receiver, in the Raman gain band; an outside Raman gain band monitoring system 160 for backscattered light from continuous wave source and/or from repetitive pulsed source, optionally time gated at the receiver, outside of the Raman gain band; a back reflected light at pump wavelengths monitoring unit system 170, an input tap and detector system 180 for monitoring the power of light, and a dispersion monitoring system 190 for dispersion measurement of the fiber.

Figure 1C:
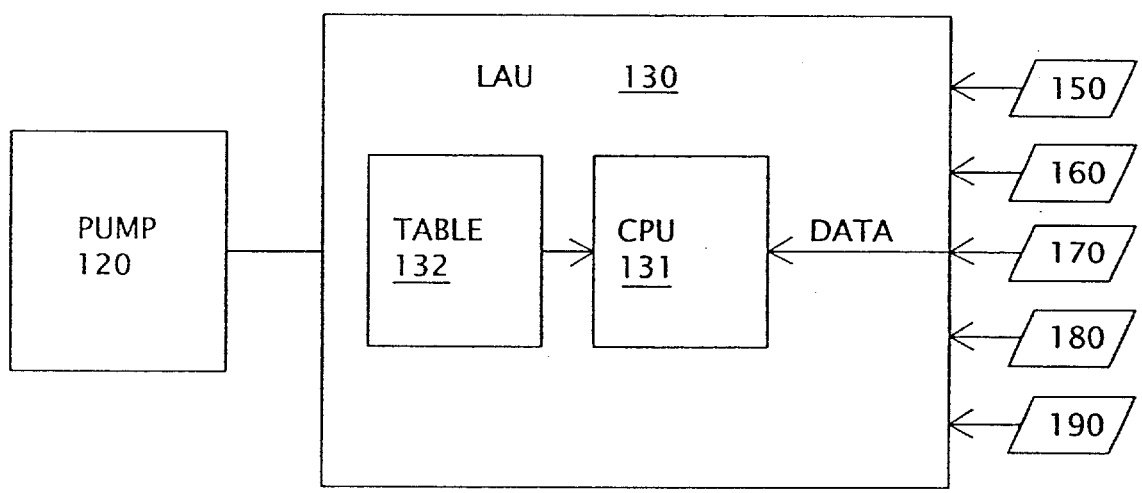
FIG. 1c shows schematically the data processing of the Line Analyzing Unit.

As seen in FIG. 1c, data from all or some of the monitoring devices mentioned above is converted from analog to digital signals, and fed into a microprocessor with a central processing unit (CPU) 131. CPU 131 compares the data received with stored data in a Table 132, and sends commands to Raman pump 120 to set the currents of Raman pump 120 in order to achieve optimal gain, gain equalization and gain tilt, prevent damage to the fiber, and provide eye safety features.

Figure 2:
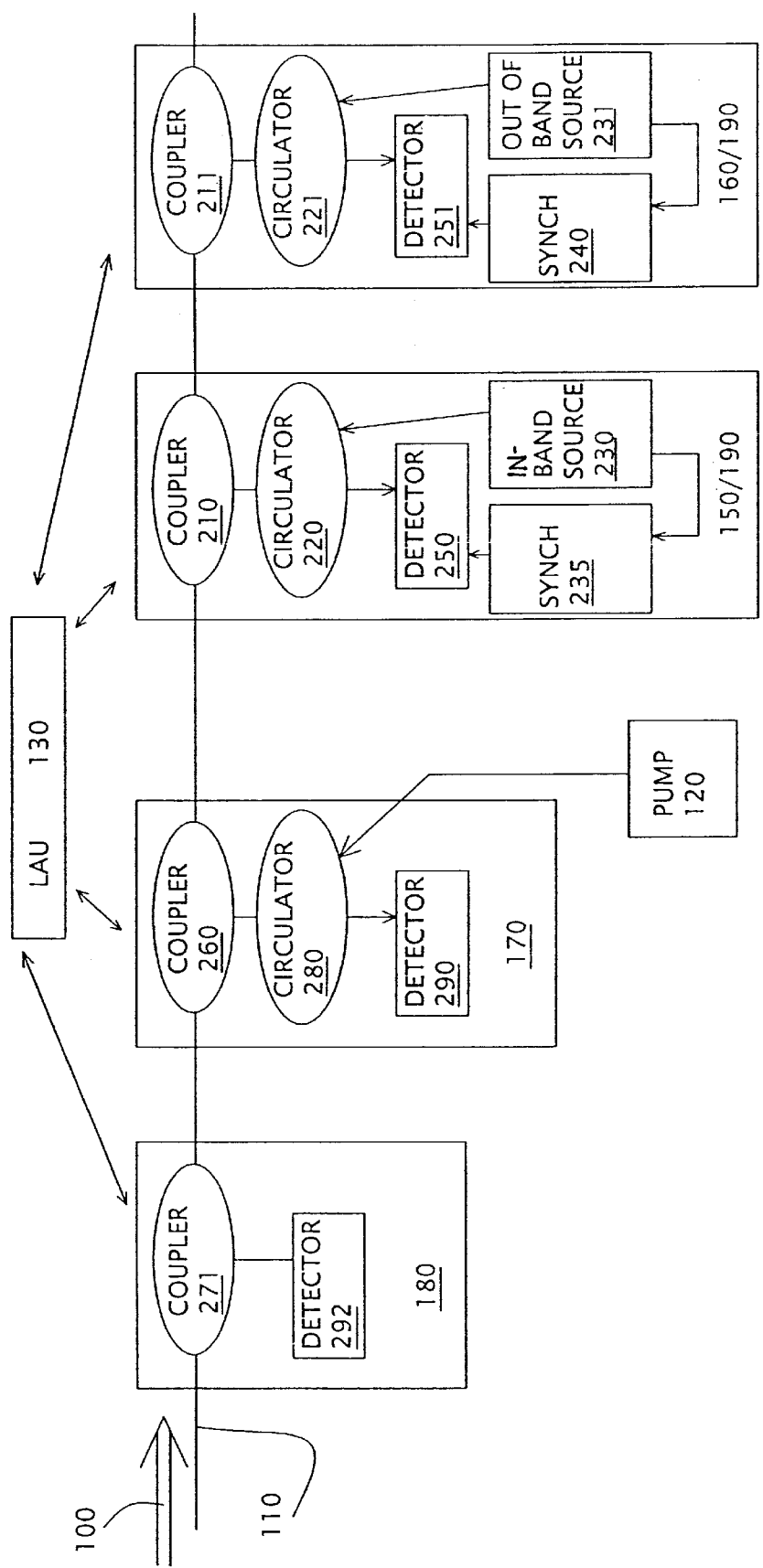
FIG. 2 shows a diagram of the Line Analyzing Unit showing its relationship with the transmission line and the hardware.

The measurement system is described in greater detail in FIG. 2. The amplification of signal (or signals) 100 is performed along optical fiber transmission line 110 by non-linear Raman processes with high power Raman pump 120. Input tap and detector system 180 performs measurements of light reaching the coupler. These measurements monitor data in signal 100 to be processed by LAU 130. A drop in the power of the data signals will initiate a shut down of pump 120. Unit 180 includes an input coupler 271 and a detector 272. Input coupler 271 couples a fraction of incoming signals 100 and/or of the backscattered Raman ASE light, and detector 272 detects these signals and/or the scattered light.

Unit 170 monitors the back-reflected light of pump unit 120, to be processed by LAU 130. A sudden increase in the back reflection light may indicate a line break or opening of a connector along the line, and will initiate a pump 120 shut down. This unit includes in addition to pump unit 120 a WDM coupler 260 a circulator 280, and a detector 290. The pump light of the pump unit 120 is passed through circulator 280 and WDM coupler 260 to line 110. Back reflected signals are passed through WDM coupler 260 and circulator 280 to detector 290.

The functionality of 150 and/or 190 unit is as follows. The functionality of 150 is the measurement of the backscattered light from continuous wave source and/or from repetitive pulsed source, optionally time gated at the receiver, in the Raman gain band. From these measurements performed at least at one pump 120 power level, the ratio between the Raman gain coefficient go and the fiber effective area $g_0/A_{eff}$ could be calculated. This ratio characterizes different fiber types. The functionality of 150 is also to measure the fiber loss, fiber length, distance to connectors and splices, and the losses of splices and connectors at wavelengths within the Raman gain band. The functionality of 150 is also to measure the backscattered Raman ASE using pump 120 at least at one power level, when light source 230 is off. The ratio between the backscattered Raman ASE measurements at more than one pump 120 power levels may indicate the type of fiber 110. The functionality of 190 is the measurement of the dispersion of the fiber. The dispersion characterizes different fiber types. This information is used to set pump unit 120 to achieve desired gain, gain equalization and gain tilt. This unit includes a WDM coupler 210 for signals within the Raman gain band, a circulator 220, a light source comprising of at least one laser diode 230, a detector 250, and synchronizing electronics 235. Light source 230 generates a continuous wave and/or repetitive pulses at least at one wavelength, which are coupled into line 110 through circulator 220 and WDM coupler 210. Returned signals within the WDM coupler 210 pass-band are passed through circulator 220 into detector 250. Detector 250 is synchronized with the generation of repetitive pulses of laser diode source 230, so that the time of flight of the pulses could be measured, from which the dispersion characteristics of the fiber can be calculated.

Figure 3:
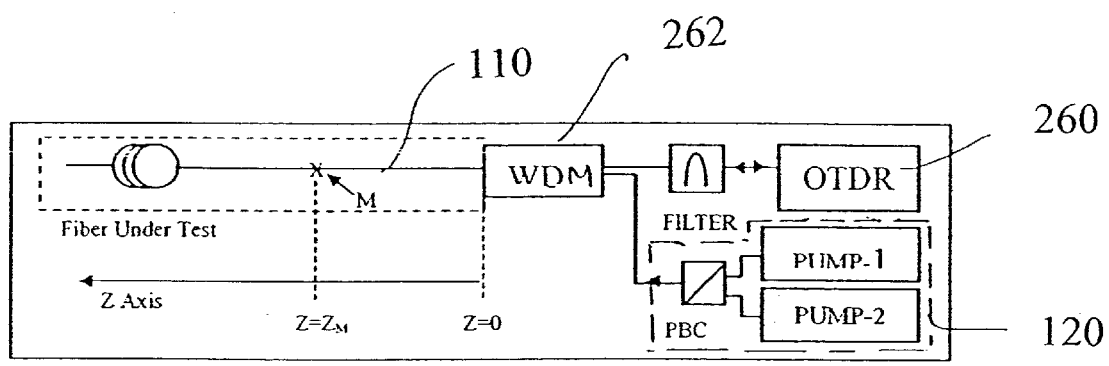
FIG. 3 shows an example of a schematic configuration for two-way Raman-amplified OTDR signals.

The functionality of 160 and/or 190 unit is as follows. The functionality of 160 is the measurement of the backscattered light from continuous wave source and/or from repetitive pulsed source, optionally time gated at the receiver, outside of the Raman gain band. The functionality of 160 is to provide the fiber loss as well as fiber length, distance to connectors and splices, and the losses of splices and connectors at wavelengths out of the Raman gain band. The functionality of 190 is the measurement of the dispersion of the fiber. The dispersion characterizes different fiber types. This information is used to set pump unit 120 to achieve desired gain, gain equalization and gain tilt. This unit includes a WDM coupler 211 for signals which are out of the Raman gain band, a circulator 221, a light source comprising of at least one laser diode 231, a detector 251, and synchronizing electronics 240. Light source 231 generates a continuous wave and/or repetitive pulses at least at one wavelength, which are coupled into line 110 through circulator 221, and WDM coupler 211. Returned signals within the WDM coupler 211 pass-band are passed through circulator 221 into detector 251. Detector 251 is synchronized with the generation of repetitive pulses of laser diode source 231, so that the time of flight of the pulses could be measured, from which the dispersion characteristics of the fiber could be calculated. From data collected by LAU 130 from units 150, 160, 170, 180 and 190, it is possible to analyze the fiber type characteristics. Thus, the information provided by the measurement described above is used to analyze the optical transmission line, determine the fiber type or types calculate and optimize the Raman gain and gain equalization. This method could also be used to characterize the transmission fiber as a separate device, independent of a Raman amplifier. Typically the method is applied using a set-up similar to that shown in FIG. 3. The set-up of FIG. 3 can be related to the measurement units of FIGS. 1 and 2 as follows: pumps Pump-1 and Pump-2 and a polarization beam combiner (PBC) in FIG. 3 are included in Pump 120 (FIGS. 1 and 2). An OTDR 260 includes in-band repetitive pulsed source 230, synchronization unit 235, detector 250 and circulator 220 as part of unit 150. A WDM 262 is used as coupler 210 that couples the OTDR light into a line 110, and couples the reflected light from line 110 into detector 250.

In a typical measurement, an OTDR pulse, having a spectrum within the amplification band of a Raman pump, and a pump light, are both coupled to a transmission fiber. The OTDR signal is propagating through the fiber while being amplified through stimulated Raman scattering in a co-propagating pumping scheme. At any point along the fiber, a fraction of the amplified pulse is Rayleigh backscattered, and propagating back towards the OTDR. This backscattered light undergoes Raman amplification in a counter-propagating pumping scheme. Initially, both the pump and the OTDR signals are coupled into the fiber at Z=0. The OTDR power, $S_1$, and the pump power, $P_1$, at any point M along the transmission fiber, located at $Z=Z_M$ from the pump (or the OTDR), can be calculated by solving the following coupled equations:

$$\frac{dS_1}{dz} = -\alpha_s S_1 + \frac{g_0}{A_{eff}K} P_1 S_1, \quad \frac{dP_1}{dz} = -\alpha_p P_1 - \frac{g_0}{A_{eff}K} P_1 S_1. \tag{4}$$

The evolution of the amplified Rayleigh backscattered OTDR signal at point M, propagating back towards the OTDR can be calculated by solving a similar set of equations:

$$\frac{dS_2}{dz} = -\alpha_s S_2 + \frac{g_0}{A_{eff}K} P_2 S_2 \quad \frac{dP_2}{dz} = \alpha_p P_2 + \frac{g_0}{A_{eff}K} P_2 S_2 \tag{5}$$

where the backscattered signal $S_2$ serves effectively as the input signal, and $P_2$ is the counter-propagating pump. Here $g_0$ is the Raman gain coefficient, and K is a numerical factor that accounts for polarization mismatch between the pump and the signal ("depolarization factor"), with K=2. The ratio $g_0/A_{eff}$ can be calculated for any point M along the fiber, and $\alpha_p$ can be measured by an OTDR. This method allows calculating the $g_0/A_{eff}$ ratio at different sections along fiber links, which are composed of different fiber types.

Assuming that pump depletion is negligible, Eqs. (4)–(5) can be solved analytically. For example, if the loss of the fiber at the pump wavelength has been characterized or measured, then the pump power at distance z from the pump, P(z), can be calculated, in the non-depletion pump approximation in the case of a single wavelength pump, according to:

$$P(z)=P_0 \exp(-\alpha_p z) \tag{6}$$

Here $P_0$ is the pump power coupled into the fiber. The total Raman gain G can be calculated in a backward pumping configuration, in the non-depletion pump approximation in the case of a single pump, according to:

$$G=\exp(g_0 \, PL_{eff}(A_{eff}K)) \tag{7}$$

and $L_{eff}$ is the effective length of the fiber calculated according to:

$$L_{eff}=(1-\exp(-\alpha_p L))/\alpha_p \quad (8)$$

with L being the total fiber length. Similarly, the two-way Raman gain is given by:

$$G=\exp(2g_0\, PL_{eff}/(A_{eff} K)) \quad (9)$$

This method of analysis is a part of the preferred embodiment. In other implementations, other methods of analysis may be employed.

Figure 4:
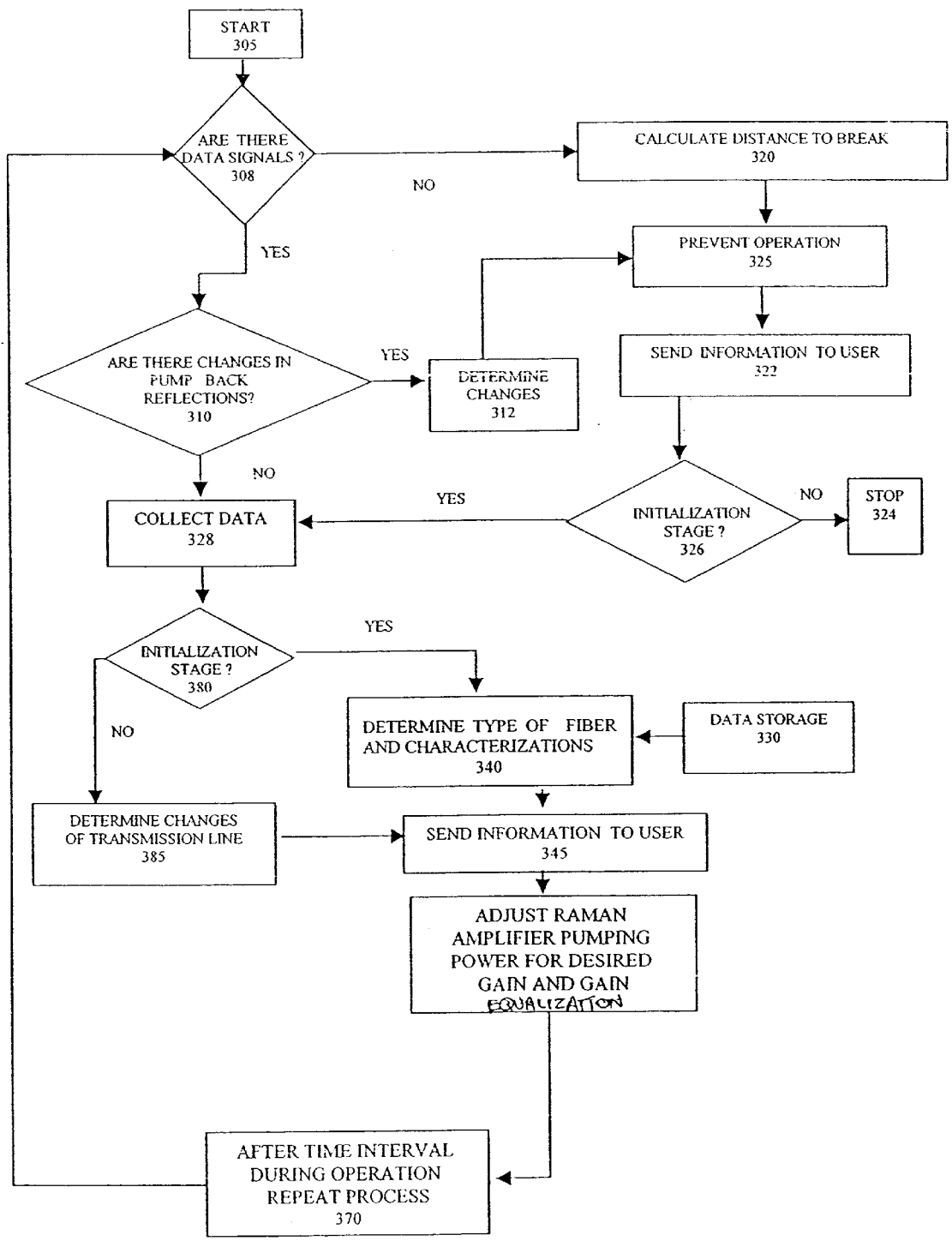
FIG. 4 shows an exemplary diagram of the optical transmission line analysis process performed by the Line Analyzing Unit showing control of the Raman pumping unit.

An exemplary operation of the LAU of the self-adjusting Raman amplifier is shown in FIG. 4, starting at 305. At the first step 308, the processor determines whether there are data signals. If no data signals have been detected, indicating a break along the line or no data transmission, then the process proceeds to step 320 where an attempt to measure or estimate the distance to break or fault is performed. Pump 120 is prevented from operating at step 325, and this information is provided to the user to facilitate inspection and repair at step 322, if a break has been detected. The process proceeds from step 322 to step 326, and the process terminates at step 324 if step 326 was reached at the initialization stage. If step 326 was reached not during the initialization stage, the process proceeds from step 326 to step 328. If data signals are present, the process proceeds from step 308 to step 310 where the question is whether there are changes in pump 120 back reflections. If there are changes in the pump 120 back reflections, indicating a connector opening along the line, the changes are determined at 312, and the process proceeds to step 325. If there are no changes in the pump 120 back reflection, the process proceeds from step 310, where information on the backscattered and reflected light is collected at 328. During initialization stage, the process proceeds from step 380 to step 340, where stored information on various optical fibers is provided to LAU processor 131 at step 330. By comparison of the measurements to this database, and by analyzing the measured data, LAU processor 131 determines the fiber type and characteristics at step 340 where the results are sent to the user at step 345. In the case the process is performed after the initialization stage, the process proceeds from step 380 to step 385 where changes to the transmission line are determined, and the information is send to the user at step 345. The process then proceeds to step 350 where the Raman amplifier pump 120 power is adjusted to produce the optimal gain and gain equalization. The process proceeds from step 350 to step 370. At step 370 the entire process of steps 308 through 370 is repeated as many times as desired during the course of the day to account for changes in the line. Such changes may include optical line switching by optical switches or slow degradation due to aging processes and temperature changes.

A number of preferred embodiment procedures could be implemented using the system described above in order to meet the desired gain, gain uniformity and gain tilt of the Raman amplifier. These procedures adjust the pumps power of the Raman amplifier using feedback from a line measurement, or a preset pump power. These embodiments are described next.

Feedback Based on Signals Power Without Wavelengths Information

Figure 5:
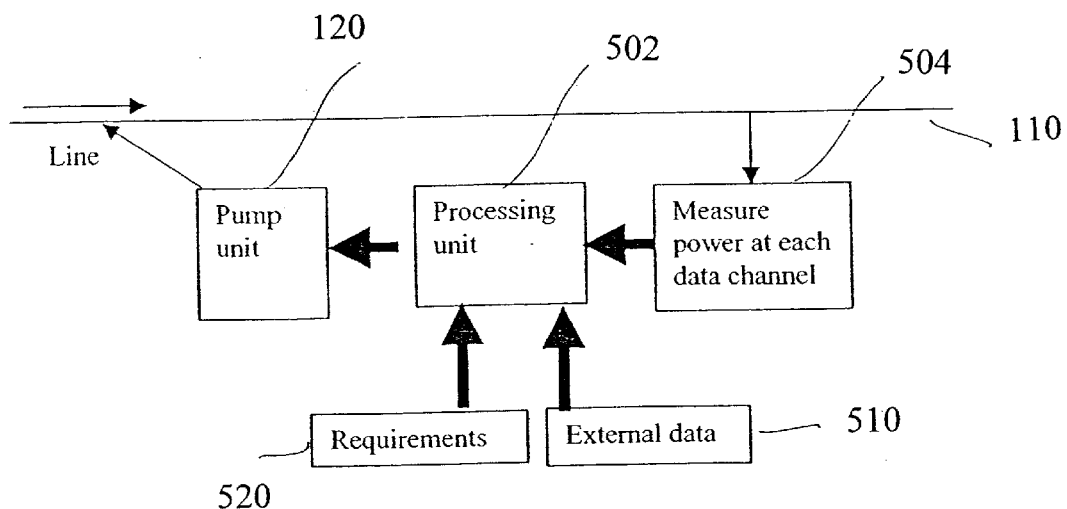
FIG. 5 shows an example of a schematic configuration for the Raman amplifier control scheme for feedback based on signals power without wavelengths information.

In this embodiment, the pumps power of the Raman amplifier is adjusted based on a feedback from the signals power of each of the data channels, without information about the actual wavelengths. FIG. 5 shows an example of a schematic configuration for the Raman control scheme. While FIG. 5 describes a backward pumping configuration, other configurations are possible, such as forward pumping, and both forward and backward pumping. In FIG. 5, a processing unit 502 receives inputs from a measurement unit 504 that measures only the power at each of the data channels of line 110, and, in response, provides inputs to Raman pump unit 120. Measurement unit 504 is connected to, and interacts with LAU 130 of FIGS. 1 and 2 in a manner analogous to that of other measurement units 150 to 190.

In terms of cost functions and optimization, the power of the individual data channels is measured at line output 140 (FIG. 1a), or provided by an External data source 510. No information as to the actual wavelengths is needed or used. This data is provided to processing unit 502 in the form of a signals power vector S, where the number of elements N represents the number of data signals, and the value $S_1$ corresponds to the power of signal i:

$$S=(S_1, S_2, \ldots, S_N) \quad (10)$$

A vector $S_d$ of desired power in each channel is formed according to desired amplifier output requirements 520, and is provided to processing unit 502:

$$S_d=(S_{d1}, S_{d2}, \ldots, S_{dN}), \quad (11)$$

and a cost C is calculated by the processing unit. Examples for cost functions are:

$$C = \sum_{i=1}^{N} W_i(S_{di}-S_i)^2 \quad (12)$$

$$C = \sum_{i=1}^{N} |S_{di}-S_i| \quad (13)$$

$$C = \sum_{i=1}^{N} W_i|S_{di}-S_i|, \quad (14)$$

where $W_1$ are weighted coefficients. A tolerance parameter $\Delta$ may also be introduced, to define the allowed tolerance for the optimization. An example for a cost function with this parameter is:

$$C = \left|\sum_{i=1}^{N} W_i(S_{di}-S_i)^2 - V\Delta\right|, \quad (15)$$

where V is a constant. Processing unit 502 calculates the cost according to the cost function, and updates the pump unit to change the individual pumps power to minimize the cost. The pumps output power determine the power at the output channels, and hence the cost. Iterative minimization algorithms perform minimization of the cost function. Examples for such algorithms are simulated annealing algorithms and genetic algorithms, which are well known in the art of multi-dimensional optimization.

While feedback schemes are commonly practiced, and those based on signals power in EDFAs are well known (e.g. in U.S. Pat. No. 6,072,614 to Roberts and U.S. Pat. No. 6,292,288 to Akasaka et. al.), the feedback schemes detailed herein are significantly different: in contrast with Roberts '614, who measures the backscattered signals in an optical transmission line in order to adjust the pumps of the EDFA to avoid or reduce nonlinear effects in the transmission line, such as stimulated Brillouin scattering, the feedback schemes detailed herein deal with adjustment of Raman pumps to achieve desired gain and gain flatness. Since the physical principles of Raman amplification are different from those of an EDFA, and consequently, the optical schemes are different, it is not obvious that EDFA feedback procedures are applicable to Raman amplification. In particular, in an EDFA, the pump(s), together with the Erbium doped fiber normally amplify the entire spectrum. In Raman amplifiers, pumps with different wavelengths are usually used to pump spectral bands with overlapping regions that are determined by the pumps spectral separation. The novelty of the present feedback schemes is embedded in the combined use of measured feedback signals in Raman amplification together with minimization of cost functions, including the specific ways of calculating these cost functions.

Akasaka et al. in '288 do teach the use of multiple Raman pumps with various combinations of different wavelengths in an optical transmission system, and, in response to signal power, adjust the powers of the pumps to keep the amplifier gain flat and/or constant. However, as made clear in their FIGS. 4 and 5, their setups allow measurements of the actual wavelengths, i.e. the functionality of an optical spectrum analyzer (OSA) providing both power and wavelengths. Thus, their feedback is essentially provided by an OSA measurement. In contrast, the feedback in the various schemes disclosed herein does not require knowledge of the wavelength, i.e. it is essentially a non-OSA feedback.

Feedback Based on Total Signals Power Within Spectral Bands

Figure 6:
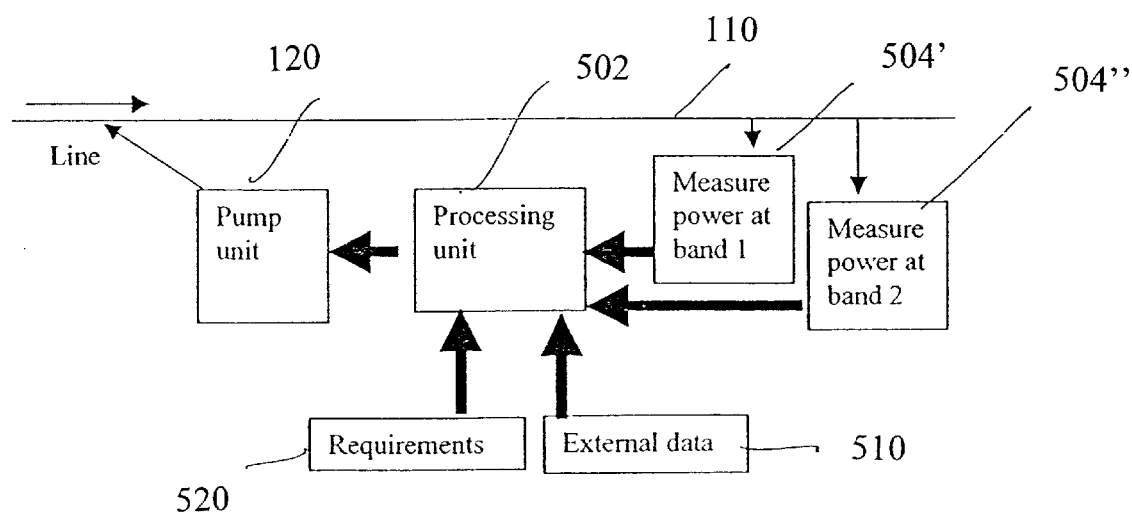
FIG. 6 shows an example of a schematic configuration for the Raman amplifier control scheme for feedback based on total signals power within spectral bands.

In this embodiment, the pumps power of the Raman amplifier is adjusted based on a feedback related to the total power measured within spectral bands, with each of the spectral bands wide enough to accommodate more than one data channel. FIG. 6 shows an example of a schematic configuration for the Raman amplifier control scheme, with two spectral bands. The configuration is similar to that of FIG. 5, except that there are two measurement units 504' and 504" instead of the one unit 504 of FIG. 5. This embodiment requires information about the existing channels wavelengths, or about the total number of channels within the spectral bands, but not on the individual channels power. The management system of the communication system (not shown) can provide this information to the Raman amplifier as External data, for example. The actual measurements can be performed by unit 180 in FIGS. 1 and 2, in which detector 272 is replaced by an array of detectors, with each detector element of the array covering a different spectral band. These detector elements would be connected to a wavelength demultiplexer (not shown) or would be wavelength selective detectors.

In terms of cost functions and optimization, the total power of the data channels within each spectral band is measured at the line output. Since the spectral bands are known, and the wavelengths or the total number of channels within the spectral bands are made available to processing unit 502, the average power per channel in each of the spectral bands is calculated by the processing unit, to form an average power per channel vector P, where the number of elements M represents the number of spectral bands, and the value $P_1$ corresponds to the average power per signal in spectral band i:

$$P=(P_1, P_2, \ldots, P_M). \tag{16}$$

A vector of desired average powers per channel at each spectral band $P_d$ is formed according to desired amplifier output requirements 520, and is provided to processing unit 502:

$$P_d=(P_{d1}, P_{d2}, \ldots, P_{dM}), \tag{17}$$

and a cost C is calculated by the processing unit. Examples for cost functions are:

$$C = \sum_{i=1}^{M} W_i(P_{di} - P_i)^2 \tag{18}$$

$$C = \sum_{i=1}^{M} |P_{di} - P_i| \tag{19}$$

$$C = \sum_{i=1}^{M} W_i|P_{di} - P_i|, \tag{20}$$

where $W_1$ are weighted coefficients. A tolerance parameter δ may also be introduced, to define the allowed tolerance for the optimization. An example for a cost function with this parameter are:

$$C = \left|\sum_{i=1}^{M} W_i(P_{di} - P_i)^2 - V\delta\right|, \tag{21}$$

where V is a constant. Processing unit 502 calculates the cost according to the cost function, and updates the pump unit to change the individual pumps power to minimize the cost. FIG. 6 describes a backward pumping configuration, but other configurations are possible, such as forward pumping, and both forward and backward pumping.

In this embodiment, as in the previous one, the feedback scheme is non-obvious because of the same arguments presented above. Since the power is measured within spectral bands containing more than one wavelength, there is no wavelength resolution of an individual channel, and no need for, or use of, the wavelength information of an OSA.

Pump Settings According to Preset Tables

Figure 7:
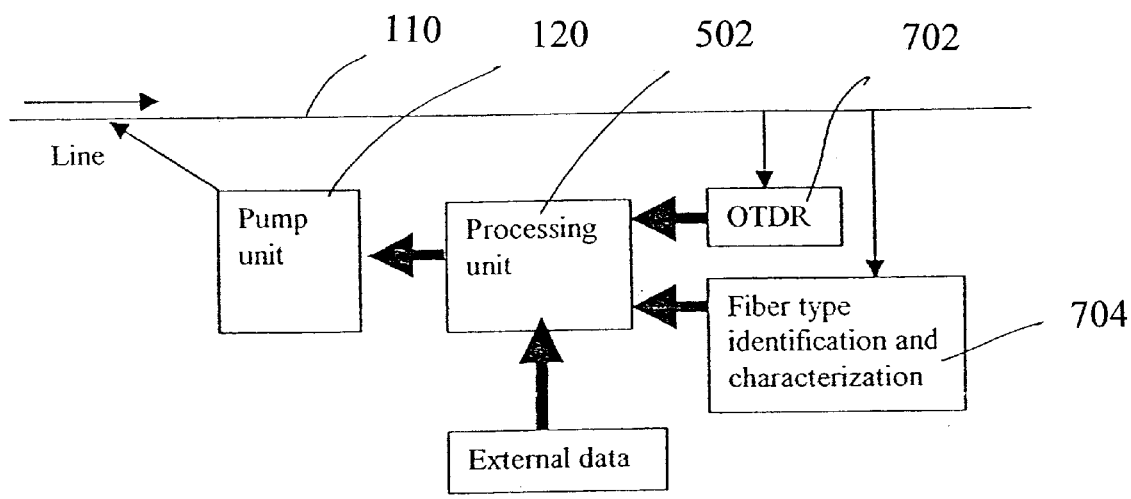
FIG. 7 shows an example of a schematic configuration for the Raman amplifier control scheme for feedback based on pump settings according to preset tables.

In this embodiment, the pump power settings for a desired gain of the Raman amplifier is adjusted based on preset values, preferably stored in tables. FIG. 7 shows a schematic configuration for the Raman amplifier control scheme. The configuration is similar to that in FIGS. 5 and 6, except for an OTDR module 702 and a fiber identification module 704, which are both connected to processing unit 502. For each type of fiber, preset data of pumps power levels for desired gain settings is stored in processing unit 502. Correction factors for the preset data may be used according to the data acquired by OTDR module 702 and fiber identification module 704. In operation, the output power at the line output is measured with the pumps turned off, using detector 272 in unit 180. Next, the pumps are set according to the tables to meet a desired gain, and the output power is measured again using detector 272. The Raman On-Off gain is then calculated from the ratio of the output powers with and without the pumps turned on. If the calculated gain is the desired gain, no further adjustments are needed. Otherwise, the pumps are re-adjusted according to the tables until the desired gain is obtained.

While FIG. 7 describes a backward pumping configuration, other configurations are possible, such as forward pumping, and both forward and backward pumping. In a forward and backward pumping scheme, OTDR measurements from both sides of the fiber link can be used to improve the correction factors. The measurements and feedback schemes of these embodiments can be performed using unit 180 and CPU 131 of FIG. 1c, with the pump power adjustment performed at step 350 in FIG. 3. In particular, the total power at the output of the amplifier provides a feedback to CPU 131 that is used to set the pumps accordingly.

Raman Amplification Application in a Mesh Network Topology

Figure 8:
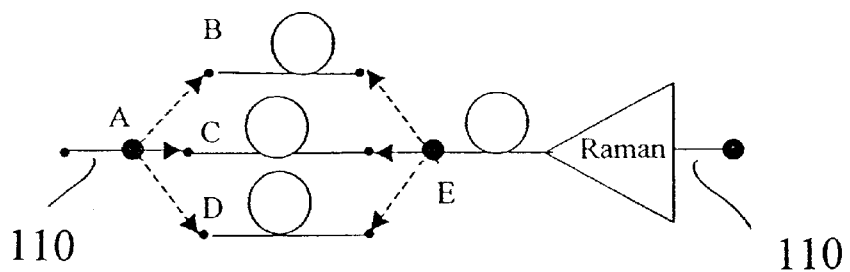
FIG. 8 shows a possible mesh configuration of an optical network with a Self-Adjusting Raman amplifier.

FIG. 8 shows a possible mesh configuration of an optical network with a self-adjusting Raman amplifier. All-optical switches at points A and E are switched to route the optical signals through different paths, for example, paths ABE, ACE and ADE. The different paths may be constructed from different fiber types, and consequently the Raman gain will be different from path to path. By using a self-adjusting Raman amplifier as described herein, the Raman amplifier would adjust itself to achieve desired gain and gain equalization for the different paths.

Raman Amplification Application in a Hybrid Raman-EDFA Configuration

Figure 9:
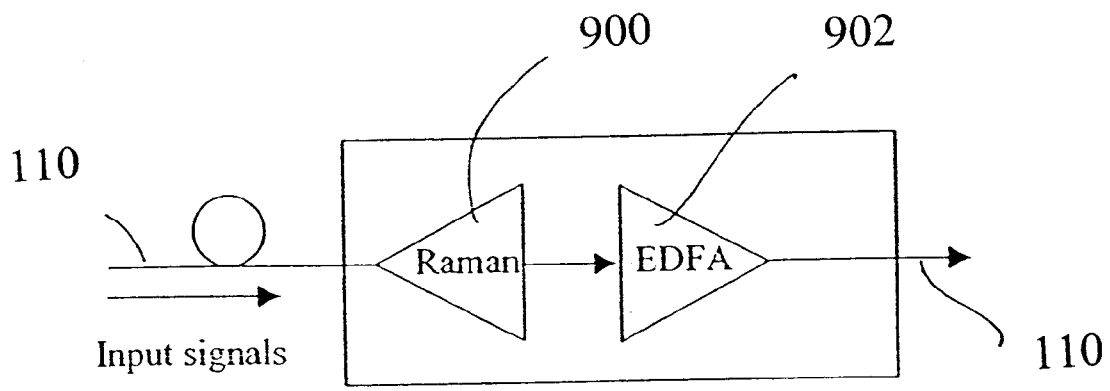
FIG. 9 shows a possible hybrid Raman-EDFA configuration.

FIG. 9 shows a possible hybrid Raman-EDFA configuration. Here, a Raman amplifier 900 is connected to an EDFA 902 and includes (not shown) a one wavelength pump unit (possibly composed of two polarization multiplexed pumps of same wavelengths), so that the Raman amplified output has a gain tilt. EDFA 902 has two functions: (a) amplifying the output signals of the Raman amplifier, and (b) compensating for the Raman gain tilt.

Demonstration of Self-adjusting Features of the Amplifier

Figure 10:
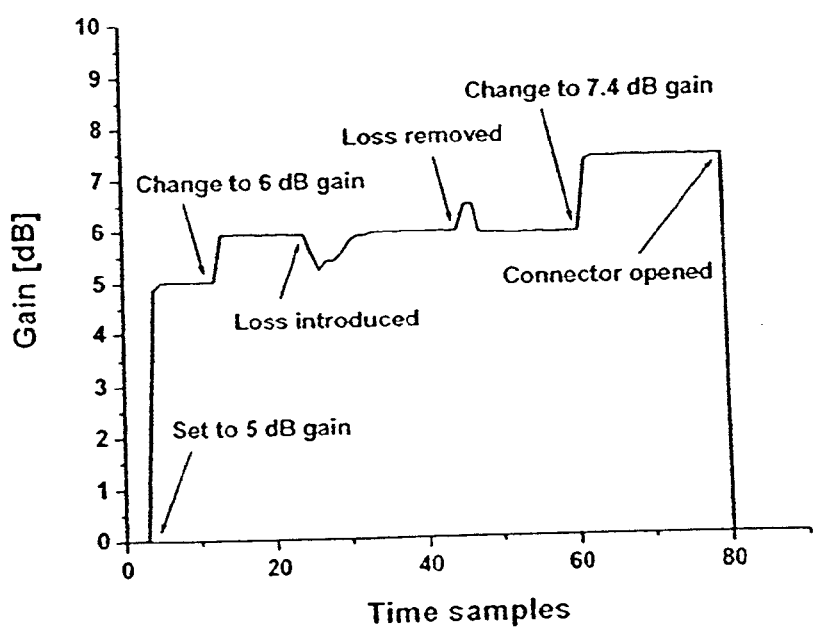
FIG. 10 demonstrates dynamic features of the Raman amplifier using installed SMF type fiber.

FIG. 10 demonstrates the following dynamic features of the self-adjusting Raman amplifier, using a SMF type fiber:

1. Gain settings
2. Automatic gain control (AGC) mechanisms
3. Eye-safety—pumps shut down on connector opening.

First, a 5 dB gain command was issued, followed by a command for 6 dB gain. Then, a 1 dB signal loss was introduced, and the AGC mechanism adjusted the pumping unit to maintain the 6 dB gain while maintaining optimal gain flatness. Then, the 1 dB loss was removed, and the AGC mechanism again adjusted the pumping unit to a 6 dB gain. As can be observed in FIG. 10, the AGC mode was activated before the manual setting and removing of the 1 dB loss was completed. Then, a command for 7.4 dB gain was issued, and the pumping unit was adjusted. Finally, the optical connector, connecting the signals to the transmission fiber was opened, a "Loss of Signal" was detected, and the pumps were shut down.

EXAMPLES

Example 1

Backscattered ASE Measurements

An example of backscattered Raman ASE measurements that fall within the scope of the present invention and can be performed with units 120 and 170 is illustrated in Table 1. Table 1 shows the ratio between the backscattered Raman ASE measured at two pump powers, 180 mW and 90 mW respectively, for different fiber types, for 25 Km long fibers and a 1450 nm wavelength pump. The results show that this ratio is a characteristic of the fiber type, and therefore can be used to identify different types of fibers. Correction factors for this data, if needed to account for different fiber losses, can be used according to OTDR measurements of the fiber.

TABLE 1

| Fiber type | Backscattered Raman ASE ratio |
| --- | --- |
| SMF | 3.64 |
| LEAF ™ | 3.92 |
| TrueWave ™ | 4.06 |
| DSF | 4.30 |

Example 2

Fiber Identification According to Dispersion Measurements

An example of fiber identification according to dispersion measurements that fall within the scope of the present invention and can be performed, for example, using unit 190 of FIG. 2, is given next. Table 2 shows typical dispersion and dispersion slope of DCF, SMF and LEAF™ fibers at 1550 nm wavelength. The data reveal that dispersion and dispersion slope are a characteristic of the fiber type, and therefore can be used to identify different types of fibers.

TABLE 2

| Fiber Type | DCF | SMF | LEAF ™ |
| --- | --- | --- | --- |
| Typical dispersion at 1550 nm [ps/nm Km] | −75 | 17 | 4 |
| Typical dispersion slope at 1550 nm [ps/nm² Km] | 0.09 | 0.06 | 0.1 |

Example 3

Eye-safety and Automatic Shut Down

Figure 11:
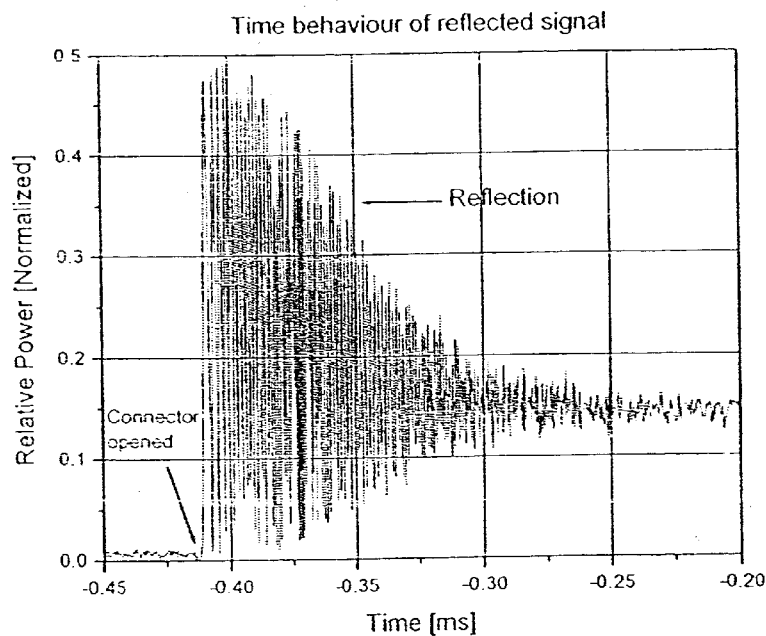
FIG. 11 shows an example of the time behavior of the back-reflected pump light from an SC/PC type optical fiber connector, connecting the Raman amplifier to the line, while opened.

This feature of one embodiment of the method of the present invention is based on continuously measuring and analyzing the change and time behavior of back-reflected pump light. This time behavior during fiber disconnection is a characteristic of the type of the disconnection and therefore can be used to identify the type of the disconnection. The time behavior of back-reflected pump light is analyzed and compared with stored data for different types of fiber disconnection. Pump shut down is initiated if the analysis indicates opening of a connector along the line or a fiber cut or break or burn, but not changes due, for example, to aging and signal fading. The back-reflected light is measured by unit 170 of FIG. 1B. LAU 130 analyzes the time behavior of the back-reflected pump light, and a decision is taken by the LAU 130 to shut down the pumps if necessary. FIG. 11 shows an example of the time behavior of the back-reflected pump light from an SC/PC type optical fiber connector, connecting the Raman amplifier to the line, while opened.

Example 4

Amplified Two-way OTDR Signals at Different Raman Pumping Powers

Figure 12:
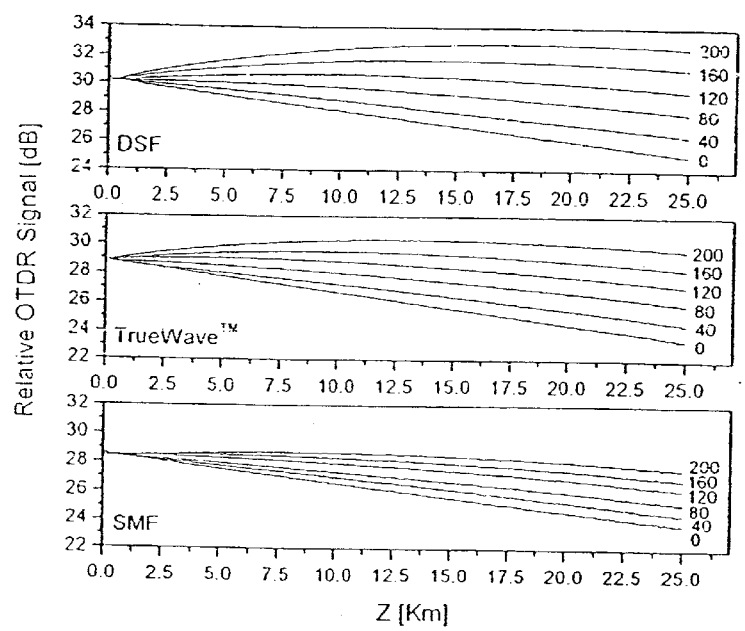
FIG. 12 shows OTDR traces of SMF, DSF and True-Wave™ RS fibers for different pump powers.

An example for amplified two-way OTDR signals at different Raman pumping powers is shown in FIG. 12, for three spools of different fibers: SMF, DSF and TrueWave™ RS. The fibers lengths were 25.2 Km, 25.2 Km and 25.1 Km, respectively. Pumps wavelength was 1450 nm, and OTDR signal wavelength was 1555 nm. The $g_0/A_{eff}$ ratio is obtained as follows:

1. Choosing an arbitrary distance $Z_M$ and for each of the fibers, the values of the relative OTDR signals as a function of the pump power are plotted.
2. A linear fit is performed (data plotted on a logarithmic scale) for each of the data sets and the slope is obtained.
3. The $g_0/A_{eff}$ ratio is calculated from the slope according to Eq. (9), taking into account $L_{eff}$. Table 3 shows measured results for the three fibers of FIG. 9.

TABLE 3

| Fiber Type | SMF | TrueWave ™ RS | DSF |
| --- | --- | --- | --- |
| $g_0/A_{eff}$ [W$^{-1}$Km$^{-1}$] | 0.65 | 1.12 | 1.39 |

Example 5

Feedback Based on Signals Power Without Wavelengths Information

Table 4 presents the optimal Raman pumps power settings achieved using this method, for a SMF type fiber. In this and following examples (Tables 4, 5 and 7), the optimization was performed with respect to the desired gain and gain equalization, and the experimental conditions were the same. Two pairs of pumps were used. The first pump pair was polarization multiplexed with a center wavelength at 1424 nm, and the second pump pair was polarization multiplexed with a center wavelength at 1452 nm. The power of the two polarization multiplexed pairs was combined using a pump combiner, and coupled into the transmission fiber using a wavelength division multiplexer. The power at each pumping wavelength is the sum of the power of the two pumps at that wavelength.

TABLE 4

| Desired Gain [dB] | Achieved Gain [dB] | Achieved Gain Flatness [dB] | Pump Power at First Wavelength [mW] | Pump Power at Second Wavelength [mW] |
|---|---|---|---|---|
| 0 | 0 | 0 | 0 | 0 |
| 4 | 4.01 | 0.24 | 57.26 | 125.23 |
| 5 | 5.12 | 0.31 | 74.40 | 158.05 |
| 6 | 5.97 | 0.37 | 84.99 | 183.59 |
| 7 | 6.96 | 0.43 | 102.12 | 211.15 |
| 8 | 7.94 | 0.51 | 117.45 | 238.70 |
| 9 | 8.94 | 0.58 | 134.58 | 266.25 |
| 10 | 9.96 | 0.65 | 154.64 | 293.81 |
| 11 | 11.09 | 0.67 | 182.37 | 322.60 |

TABLE 4-continued

| Desired Gain [dB] | Achieved Gain [dB] | Achieved Gain Flatness [dB] | Pump Power at First Wavelength [mW] | Pump Power at Second Wavelength [mW] |
|---|---|---|---|---|
| 12 | 12.04 | 0.74 | 202.43 | 344.89 |
| 13 | 12.98 | 0.78 | 228.34 | 363.03 |
| 14 | 13.93 | 0.86 | 242.55 | 388.23 |

Example 6

Feedback Based on Total Signals Power Within Spectral Bands

Table 5 presents the optimal Raman pumps power settings achieved using this method, for a SMF type fiber different than that used for the results shown in Table 4, with two spectral bands covering the C-band wavelength range. The optimization was performed with respect to the desired gain and gain equalization. Here two pairs of pumps were used. The first pump pair was polarization multiplexed with a center wavelength at 1424 nm, and the second pump pair was polarization multiplexed with a center wavelength at 1452 nm. The power of the two polarization multiplexed pairs were combined using a pump combiner, and coupled into the transmission fiber using a wavelength division multiplexer. The power at each pumping wavelength is the sum of the power of the two pumps at that wavelength.

TABLE 5

| Desired Gain [dB] | Achieved Gain [dB] | Achieved Gain Flatness [dB] | Pump Power at First Wavelength [mW] | Pump Power at Second Wavelength [mW] |
|---|---|---|---|---|
| 0 | 0 | 0 | 0 | 0 |
| 3 | 3.03 | 0.21 | 89.57 | 154.70 |
| 4 | 4.01 | 0.33 | 125.15 | 200.25 |
| 5 | 5.01 | 0.4 | 155.21 | 249.65 |
| 6 | 6.04 | 0.49 | 193.18 | 295.94 |
| 7 | 7 | 0.62 | 227.05 | 338.93 |
| 8 | 7.98 | 0.69 | 261.33 | 381.91 |

Example 7

Pump Settings According to Preset Tables

A general example for preset table data structure for different fiber types, for a Raman amplifier with four pumping wavelengths is shown in Table 6.

TABLE 6

| Desired Gain [dB] | Fiber type 1 — Pumps Power [mW] | | | | Fiber type 2 — Pumps Power [mW] | | | | Fiber type 3 — Pumps Power [mW] | | | |
|---|---|---|---|---|---|---|---|---|---|---|---|---|
| G1 | P11 | P12 | P13 | P14 | P11' | P12' | P13' | P14' | P11" | P12" | P13" | P14" |
| G2 | P21 | P22 | P23 | P24 | P21' | P22' | P23' | P24' | P21" | P22" | P23" | P24" |
| GN | PN1 | PN2 | PN3 | PN4 | PN1' | PN2' | PN3' | PN4' | PN1" | PN2" | PN3" | PN4" |

Here G1–GN is the desired gain, and Pij is the power of pump j for desired gain Gi. Fiber types 1–3 can be, for example, SMF, TrueWave™ and DSF. An example for the use of such a table for a particular fiber type (SMF) is shown in Table 7.

TABLE 7

| Desired Gain [dB] | Fiber type-SMF-Pumps Power [mW] | | | |
|---|---|---|---|---|
| | Pump 1 | Pump 2 | Pump 3 | Pump 4 |
| 0 | 0 | 0 | 0 | 0 |
| 4.01 | 28.63 | 28.63 | 62.62 | 62.62 |
| 5.12 | 37.2 | 37.2 | 79.03 | 79.03 |
| 5.97 | 42.50 | 42.50 | 91.80 | 91.80 |
| 6.96 | 51.06 | 51.06 | 105.58 | 105.58 |
| 7.94 | 58.73 | 58.73 | 119.35 | 119.35 |
| 8.94 | 67.29 | 67.29 | 133.13 | 133.13 |
| 9.96 | 77.32 | 77.32 | 146.91 | 146.91 |
| 11.09 | 91.19 | 91.19 | 161.3 | 161.3 |
| 12.04 | 101.22 | 101.22 | 172.45 | 172.45 |
| 12.98 | 114.17 | 114.17 | 181.52 | 181.52 |
| 13.93 | 121.28 | 121.28 | 194.12 | 194.12 |

The invention described here significantly improves upon the prior art by providing an optical fiber transmission line diagnostic mechanism, coupled to a Raman pump unit, in order to calculate adjust and optimize the operating parameters of the Raman amplifier. This diagnostic mechanism can also prevent initiation of Raman amplification when breaks or cracks are present in the transmission line that would prove destructive because of electric arcing. The invention has the capability to continuously monitor the optical fiber transmission line by performing tests during the operation of the Raman amplifier. It is readily apparent that the embodiments described above represent a significant advance in the fiber optic telecommunication arts.

The telecommunications systems described above are for purposes of example only. An embodiment of the invention may be implemented in any type of fiber optic telecommunications system environment. Thus, a method and apparatus for a self-adjusting Raman amplifier for fiber optic transmission lines is described in conjunction with one or more specific embodiments. The invention is defined by the claims and their full scope of equivalents.

What is claimed is:

1. A method of operating an optical fiber transmission line wherethrough signals are transmitted in a signal wavelength band, comprising the steps of:
   (a) pumping the transmission line, using at least one optical pump, thereby effecting Raman amplification of the signals;
   (b) determining at least one characteristic of the optical fiber transmission line, said at least one characteristic selected from the group consisting of types of fiber sections in the transmission line, lengths of said fiber sections, Raman gain coefficients of said fiber sections, and effective areas of said fiber sections, and
   (c) adjusting a power of said at least one optical pump in accordance with said at least one characteristic.

2. The method of claim 1, wherein said determining and said adjusting are effected prior to said pumping.

3. The method of claim 1, wherein said determining and said adjusting are effected during said pumping.

4. The method of claim 1, wherein said pumping is effected in a pump wavelength band, and wherein determining said at least one characteristic further includes determining at least one characteristic selected from the group consisting of an optical propagation loss in the signal wavelength band and an optical propagation loss in said pump wavelength band.

5. The method of claim 1, wherein said at least one characteristic further includes a ratio of said Raman gain coefficient to said fiber effective area.

6. The method of claim 5, wherein said determining of said ratio is effected by steps including measuring a Raman on-off gain of the transmission line.

7. The method of claim 6, wherein said measuring is effected using a pulsed signal synchronized with a pulsed light source.

8. The method of claim 6, wherein said measuring is effected using a continuous wave signal.

9. The method of claim 7, wherein said measuring is effected at at least two power levels of said at least one optical pump.

10. The method of claim 1, wherein said at least one characteristic further includes a ratio of backscattered Raman Amplified Spontaneous Emission (Raman ASE) at at least two powers of said at least one optical pump.

11. The method of claim 1, wherein said determining of said at least one characteristic includes the step of:
    (i) measuring at least one material property of the transmission line.

12. The method of claim 11, wherein said at least one material property is selected from the group consisting of on-off Raman gain, backscattered Raman Amplified Spontaneous Emission (Raman ASE), and fiber dispersion.

13. The method of claim 11, wherein said determining of said at least one characteristic further includes the steps of:
    (ii) providing a data set that includes a plurality of fiber types and respective values of said at least one material property; and
    (iii) correlating said measurement of said at least one material property with said data set to determine at least one said fiber types of the transmission line.

14. The method of claim 11, wherein said at least one material property is selected from the group consisting of a ratio of a Raman gain coefficient to a fiber effective area and a ratio of backscattered Raman Amplified Spontaneous Emission (Raman ASE) at at least two power levels of said at least one optical pump.

15. The method of claim 11, wherein said determining is effected by detecting a backreflection of said pumping.

16. The method of claim 13, wherein said adjusting includes disabling said at least one optical pump.

17. The method of claim 1, wherein said determining is effected by detecting a loss of power of the signals.

18. A method of operating an optical fiber transmission line wherethrough signals are transmitted in a signal wavelength band, comprising the steps of:
    (a) pumping the transmission line, using at least one optical pump, thereby effecting Raman amplification of the signals;
    (b) determining at least one characteristic of the optical fiber transmission line, said at least one characteristic selected from the group consisting of connector quality along the transmission line, splice quality along the transmission line and maximal allowed launched pump power, and
    (c) adjusting a power of said at least one optical pump in accordance with said at least one characteristic.

19. A system for optimizing the performance of an optical transmission line, comprising:
    (a) at least one optical pump for pumping the transmission line to amplify signals that are transmitted therethrough by Raman amplification;
    (b) at least one monitoring system for determining at least one characteristic of the transmission line, said at least one monitoring system including
        (i) an internal light source; and
        (ii) a mechanism for coupling light from said light source into the transmission line; and
    (c) a line analyzing unit for adjusting a power of said at least one optical pump in accordance with said at least one characteristic.

20. The system of claim 19, wherein said at least one monitoring system for determining at least one characteristic of the transmission line further includes
    (iii) a light detector, and
    (iv) a mechanism for diverting light from the transmission line to said detector.

21. The system of claim 19, wherein said light from said internal light source is in a Raman gain band of the transmission line, relative to said at least one optical pump.

22. The amplifier of claim 19, wherein said light from said internal light source is outside of a Raman gain band of the transmission line, relative to said at least one optical pump.

23. The system of claim 19, wherein said light source is continuous.

24. The system of claim 23, wherein said light source is pulsed.

25. The system of claim 24, wherein said light detector is synchronized with said pulsed light source.

26. The system of claim 19, wherein said mechanism for coupling light includes:
    (a) a circulator that is optically coupled to said detector and to said light source; and
    (b) a coupler that is optically coupled to said circulator and to the transmission line.

27. The system of claim 19, wherein said mechanism for diverting light includes:
(a) a circulator that is optically coupled to said detector and to said at least one optical pump; and
(b) a coupler that is optically coupled to said circulator and to the transmission line.

28. A method of operating an optical fiber transmission line wherethrough signals are transmitted, comprising the steps of:
(a) pumping the transmission line, using at least one optical pump, thereby effecting Raman amplification of the signals;
(b) measuring a total power of the signals within at least one spectral band that accommodates a plurality of channels, and
(c) adjusting a power of said at least one optical pump in accordance with said total power of the signals.

29. The method of claim 28, wherein said adjusting a power of said at least one optical pump in accordance with said total power includes forming a vector of measured average power values using said total power, providing a vector of desired average power values, calculating a cost according to said vectors of desired and measured power values, and minimizing said cost.

30. The method of claim 29, wherein said substep of forming a vector of measured average power values using said total power further includes dividing said total power by said plurality of channels in said at least one spectral band.

31. The method of claim 29, wherein said calculating a cost further includes using an optional tolerance parameter to define an allowed tolerance for said minimizing.

32. A method of operating an optical fiber transmission line wherethrough signals are transmitted, comprising the steps of:
(a) pumping the transmission line, using at least one optical pump, thereby effecting Raman amplification of the signals;
(b) measuring a power of the signals, said measuring including a wavelength-independent measurement of a signal power of each individual channel in the transmission line, and
(c) adjusting a power of said at least one optical pump in accordance with said signal power of each individual channel.

33. The method of claim 32, wherein said adjusting a power of said at least one optical pump in accordance with said wavelength-independent measurement of a signal power of each individual channel includes forming a vector of measured power values using said wavelength-independent power values, providing a vector of desired wavelength independent power values, calculating a cost according to said vectors of desired and measured power values, and minimizing said cost.

34. The method of claim 33, wherein said calculating a cost further includes using an optional tolerance parameter to define an allowed tolerance for said minimizing.

35. A method of operating an optical fiber transmission line wherethrough signals are transmitted, comprising the steps of:
(a) pumping the transmission line, using at least one optical pump, thereby effecting Raman amplification of the signals;
(b) measuring a power of the signals with said at least one optical pump switched on and measuring the power with said at least one optical pump turned off, and
(c) adjusting a power of said at least one optical pump includes with said pump turned on while using said preset data as input.

* * * * *